(12) United States Patent
Horita

(10) Patent No.: US 11,611,805 B2
(45) Date of Patent: Mar. 21, 2023

(54) VIDEO STREAMING APPARATUS, VIDEO EDITING APPARATUS, AND VIDEO DELIVERY SYSTEM

(71) Applicant: Panasonic Intellectual Property Management Co., Ltd., Osaka (JP)

(72) Inventor: Seiji Horita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/667,649

(22) Filed: Feb. 9, 2022

(65) Prior Publication Data

US 2022/0272417 A1   Aug. 25, 2022

Related U.S. Application Data

(63) Continuation of application No. 15/443,457, filed on Feb. 27, 2017, now Pat. No. 11,284,156.

(30) Foreign Application Priority Data

Mar. 2, 2016   (JP) .................... 2016-039680

(51) Int. Cl.
*H04N 21/472* (2011.01)
*H04N 21/4147* (2011.01)
(Continued)

(52) U.S. Cl.
CPC ..... *H04N 21/47205* (2013.01); *G11B 27/031* (2013.01); *G11B 27/102* (2013.01);
(Continued)

(58) Field of Classification Search
CPC ....... H04N 21/47205; H04N 21/23412; H04N 21/4147; H04N 21/4223; H04N 21/4325;
(Continued)

(56) References Cited

U.S. PATENT DOCUMENTS

| | | | |
|---|---|---|---|
| 11,284,156 B2 * | 3/2022 | Horita | H04N 21/4325 |
| 2003/0174213 A1 * | 9/2003 | Matsumoto | H04N 1/00132 |
| | | | 348/207.2 |

(Continued)

FOREIGN PATENT DOCUMENTS

| | | |
|---|---|---|
| JP | 2005-168056 A | 6/2005 |
| JP | 2008-199677 A | 8/2008 |

OTHER PUBLICATIONS

Allowed Claims from Parent U.S. Appl. No. 15/443,457, filed Feb. 27, 2017.

(Continued)

*Primary Examiner* — Nathan J Flynn
*Assistant Examiner* — Christine A Kurien
(74) *Attorney, Agent, or Firm* — Renner, Otto, Boisselle & Sklar, LLP

(57) ABSTRACT

A video delivery system according to the present disclosure includes: a video streaming apparatus which records and transmits a video data; and a video editing apparatus which receives video data and edits a video based on the video data. The video streaming apparatus includes a streaming processing unit which transmits information which indicates whether a record processing unit has recorded a video file. The video editing apparatus includes range designation means which indicates, to a user, a time range for which the video streaming apparatus has recorded a video file, based on determination by the additional information interpretation means.

5 Claims, 11 Drawing Sheets

(51) Int. Cl.
  *H04N 21/432* (2011.01)
  *H04N 21/234* (2011.01)
  *H04N 21/4223* (2011.01)
  *H04N 21/433* (2011.01)
  *G11B 27/34* (2006.01)
  *G11B 27/10* (2006.01)
  *G11B 27/031* (2006.01)
  *G11B 27/11* (2006.01)

(52) U.S. Cl.
  CPC .............. *G11B 27/11* (2013.01); *G11B 27/34* (2013.01); *H04N 21/23412* (2013.01); *H04N 21/4147* (2013.01); *H04N 21/4223* (2013.01); *H04N 21/4325* (2013.01); *H04N 21/4334* (2013.01); *H04N 21/47217* (2013.01)

(58) Field of Classification Search
  CPC ......... H04N 21/4334; H04N 21/47217; G11B 27/031; G11B 27/102; G11B 27/11; G11B 27/34
  See application file for complete search history.

(56) References Cited

U.S. PATENT DOCUMENTS

| | | | |
|---|---|---|---|
| 2010/0235528 A1* | 9/2010 | Bocharov | H04L 67/568 709/248 |
| 2011/0026414 A1* | 2/2011 | Banerjee | H04L 1/1877 370/252 |
| 2012/0206653 A1* | 8/2012 | Graves | G11B 27/031 348/E5.062 |
| 2015/0187389 A1* | 7/2015 | Horita | G11B 31/006 386/264 |
| 2016/0142752 A1* | 5/2016 | Ohno | H04N 21/2402 725/116 |

OTHER PUBLICATIONS

Adobe Creative Team, Advanced Digital Video Editing Techiniques with Adobe Creative Cloud, Aug. 5, 2013 (Year: 2013).

* cited by examiner

FIG. 8

| Type value | Content |
|---|---|
| 0x01 | Time Stamp. Timestamp of video with which this additional information is associated. |
| 0x02 | Flags. Sequence of bits indicating status of video streaming apparatus. |
| 0x03 | Duration. Value indicating duration of current operational state. |
| 0x04 | Clip ID. Information for identifying video file in which high-resolution video is recorded. |
| 0x05 | Media ID. Information for identifying recording medium in which high-resolution video is recorded. |

FIG. 9

```xml
<?xml version="1.0" encoding="UTF-8" standalone="yes" ?>
<CBMain>
 <Request type="playlist_export">
  <Upload>
   <URL>sftp://xxx.yyy.net/content/hires/0001/</URL>
   <User>toscanini</User>
   <Password>rDzkcb3g</Password>
  </Upload>
  <EditContent>
   <UserEditListName>Sample #1</UserEditListName>
   <TrackList>
    <ClipTrack>
     <EventList>
      <Event>
       <Duration>180</Duration>
       <Source>
        <MediaID>AA009D09660011223344556677889903</MediaID>
        <ClipID>
         060A2B340101010501010D43130000001381367103405FF0000000000000080
        </ClipID>
        <Offset>30</Offset>
       </Source>
      </Event>
      <Event>
       <Duration>40</Duration>
       <Source>
        <MediaID>AA009D09660011223344556677889900</MediaID>
        <ClipID>
         060A2B340101010501010D43130000001381367103405FF0000000000000080
        </ClipID>
        <Offset>540</Offset>
       </Source>
      </Event>
     </EventList>
    </ClipTrack>
   </TrackList>
  </EditContent>
 </Request>
</CBMain>
```

FIG. 12

```xml
<?xml version="1.0"?>
<P2Main>
  <ClipContent>
    <ClipName>001</ClipName>
    <GlobalClipID>
      060A2B340101010501010D43130000000AB93587761630501008045820008002
    </GlobalClipID>
    <MediaID>AA0020B966001122334455667788990O</MediaID>
    <Duration>118</Duration>
    <EditUnit>1001/30000</EditUnit>
    <EssenceList>
      <Video ValidAudioFlag="false">
        <VideoFormat>MXF</VideoFormat>
        <Codec>AVI00_1080/59.94i</Codec>
        <FrameRate DropFrameFlag="true">59.94i</FrameRate>
        <StartTimecode>16:05:59:27</StartTimecode>
        <StartBinaryGroup>070F6003</StartBinaryGroup>
        <AspectRatio>16:9</AspectRatio>
        <VideoIndex>
          <StartByteOffset>32768</StartByteOffset>
          <DataSize>56640000</DataSize>
        </VideoIndex>
      </Video>
      <Audio>
        <AudioFormat>MXF</AudioFormat>
        <SamplingRate>48000</SamplingRate>
        <BitsPerSample>16</BitsPerSample>
        <AudioIndex>
          <StartByteOffset>32768</StartByteOffset>
          <DataSize>377976</DataSize>
        </AudioIndex>
      </Audio>
    </EssenceList>
    <ClipMetadata>
      <DataSource>SHOOTING</DataSource>
      <Access>
        <CreationDate>2013-09-26T11:35:22+00:00</CreationDate>
        <LastUpdateDate>2013-09-26T11:35:35+00:00</LastUpdateDate>
      </Access>
      <Device>
        <Manufacturer>Panasonic</Manufacturer>
        <SerialNo.>92TA00901</SerialNo.>
        <ModelName>AG-HPX600MC</ModelName>
      </Device>
      <Media>
        <Manufacturer>Panasonic</Manufacturer>
        <SerialNo.>AZ3B8R001</SerialNo.>
        <ModelName>AJ-P2C032AG</ModelName>
      </Media>
      <Shoot>
        <StartDate>2013-09-26T11:32:45+00:00</StartDate>
        <EndDate>2013-09-26T11:32:49+00:00</EndDate>
      </Shoot>
      <Memos>
        <Memo id="0">
          <Offset>82</Offset>
          <Text>President</Text>
        </Memo>
      </Memos>
    </ClipMetadata>
  </ClipContent>
</P2Main>
```

FIG. 13

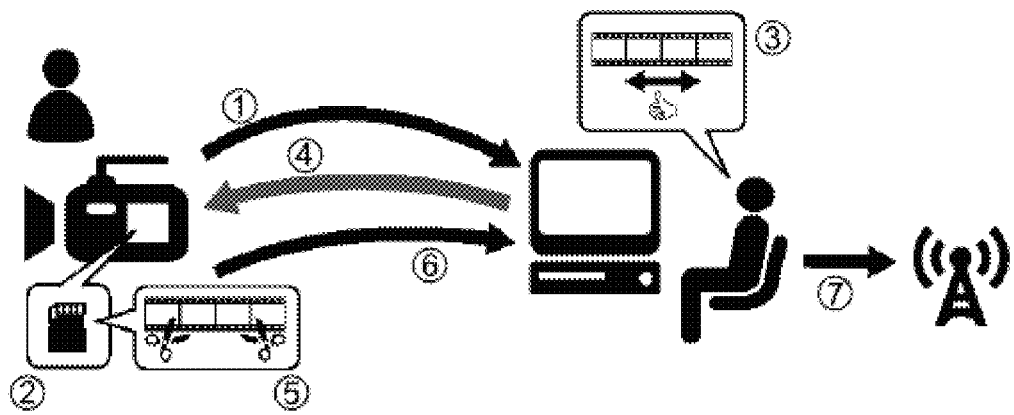

① Video streaming apparatus constantly streams low-resolution video to video editing apparatus.

② Video streaming apparatus records high-resolution video as a file into recording medium, according to recording operation by camera operator.

③ While watching streamed low-resolution video, operator of video editing apparatus designates a range for which the operator desires for high-resolution video.

④ Information on the range designated by the operator of video editing apparatus is transmitted to video streaming apparatus.

⑤ Video streaming apparatus extracts high-resolution video covering the designated range from high-resolution video file recorded in the recording medium.

⑥ Video streaming apparatus transfers the extracted high-resolution video over network.

⑦ Transferred high-resolution video is used for purposes where high-definition video is needed, such as broadcasting.

VIDEO STREAMING APPARATUS, VIDEO EDITING APPARATUS, AND VIDEO DELIVERY SYSTEM

This is a continuation under 35 U.S.C. § 120 of U.S. application Ser. No. 15/443,457, filed on Feb. 27, 2017, and claims priority under 35 U.S.C § 119 to Japanese Patent Application No. 2016-039680, filed on Mar. 2, 2016, the entire disclosures of which are incorporated herein by reference.

BACKGROUND

1. Technical Field

The present disclosure relates to a video streaming apparatus which transmits a video over a network, a video editing apparatus which receives a video from a network, and a video delivery system.

2. Description of Related Art

Japanese Unexamined Patent Application Publication No. 2005-168056 discloses a camera which includes a data communication unit which transfers image data of an object and identification data corresponding to the image data; storage means for storing captured frames; and storage means for storing transfer image data. This allows a user to upload captured image data to an online service that is provided by, for example, a photo store, thereby obviating the need for the user to hand over a recording medium to a photo printing service provider, and saving labor and time for ordering prints of pictures, for example. As such, user convenience obtained by transferring pictures and videos to a server on the Internet is very high.

Japanese Unexamined Patent Application Publication No. 2008-199677 discloses a video delivery system to which a video camera is connected, the video delivery system simultaneously generating high-resolution video data and low-resolution video data, transferring the low-resolution video data to a recipient terminal via a network, and delivering, in response to a resend request from the recipient terminal, the high-resolution video data for a video a predetermined time prior to the moment at which the resend request is given. This allows a user to check all video data that are transmitted from a remote camera and obtain, via a network, high-resolution video data for a desired portion, in the video data, which the user requests through the check.

SUMMARY

A video streaming apparatus according to the present disclosure records and transmits video data. The video streaming apparatus includes a video generation unit, a streaming processing unit, and a record processing unit. The video generation unit generates first video data and second video data. The first video data is high bit rate video data. The second video data is low bit rate video data of which bit rate is lower than the bit rate of the first video data. The second video data is generated based on a video which the first video data is based on. The streaming processing unit divides the second video data to generate a transmission packet and transmits the transmission packet. The record processing unit controls recording the first video data as a video file into a recording medium, depending on an operational instruction by a user. The streaming processing unit transmits information indicating whether the record processing unit has recorded the first video data in the video file.

A video editing apparatus according to the present disclosure receives video data and edits a video based on the video data. The video editing apparatus includes additional information interpretation means and range designation means. The additional information interpretation means interprets additional information associated with the video data. The range designation means is designation means for allowing a user to select a time range in the video. The additional information interpretation means determines, from the additional information, whether first video data corresponding to editing video data to be edited is held in a video streaming apparatus from which the editing video data has been transmitted. The range designation means indicates, to the user, a time range for which the first video data corresponding to the editing video data is held in the video streaming apparatus, based on the determination by the additional information interpretation means.

The video editing apparatus according to the present disclosure receives video data and edits a video based on the video data, the video editing apparatus including: additional information interpretation means for interpreting additional information associated with the video data; and range designation means for allowing a user to select a time range needed by the user in the video. The additional information interpretation means determines, from the additional information, whether a video streaming apparatus, which has transmitted a video data to be edited, has recorded a video file upon the transmission of the video data. Based on the determination by the additional information interpretation means, the range designation means indicates, to the user, a time range for which the video data is held in the video streaming apparatus.

A video delivery system according to the present disclosure includes: a video streaming apparatus which records and transmits video data; and a video editing apparatus which receives the video data and edits a video based on the video data. The video streaming apparatus includes a video generation unit, a streaming processing unit, and a record processing unit. The video generation unit generates first video data and second video data. The first video data is high bit rate video data. The second video data is low bit rate video data of which bit rate is lower than the bit rate of the first video data. The second video data is generated based on a video which the first video data is based on. The streaming processing unit divides the second video data to generate a transmission packet and transmits the transmission packet. The record processing unit controls recording the first video data as a video file into a recording medium, depending on an operational instruction by a user. The streaming processing unit transmits, as additional information, information indicating whether the record processing unit has recorded the first video data in the video file. The video editing apparatus includes additional information interpretation means and range designation means. The additional information interpretation means interprets additional information associated with received video data. The range designation means is designation means for allowing a user to select a time range in the video. The additional information interpretation means determines, from the additional information, whether first video data corresponding to editing video data to be edited is held in a video streaming apparatus from which the editing video data has been transmitted. The range designation means indicates, to the user, a time range for which the first video data is held in the video streaming apparatus, based on the determination by the additional information interpretation means.

According to the video streaming apparatus of the present disclosure, a user of the video editing apparatus which receives streaming can readily check whether high-resolution video data corresponding to low-resolution video data received by the video editing apparatus is recorded in the video streaming apparatus, etc.

BRIEF DESCRIPTION OF DRAWINGS

FIG. 8 is a diagram showing an example of a type included in a Payload portion according to the embodiment.

FIG. 9 is a diagram showing an example of a high-resolution video transfer command according to the embodiment.

FIG. 12 is a diagram showing an example of the content of a meta data file according to the embodiment.

FIG. 13 is a diagram illustrating a flow of video editing using a video delivery system according to the embodiment.

DETAILED DESCRIPTION

Figure 1:
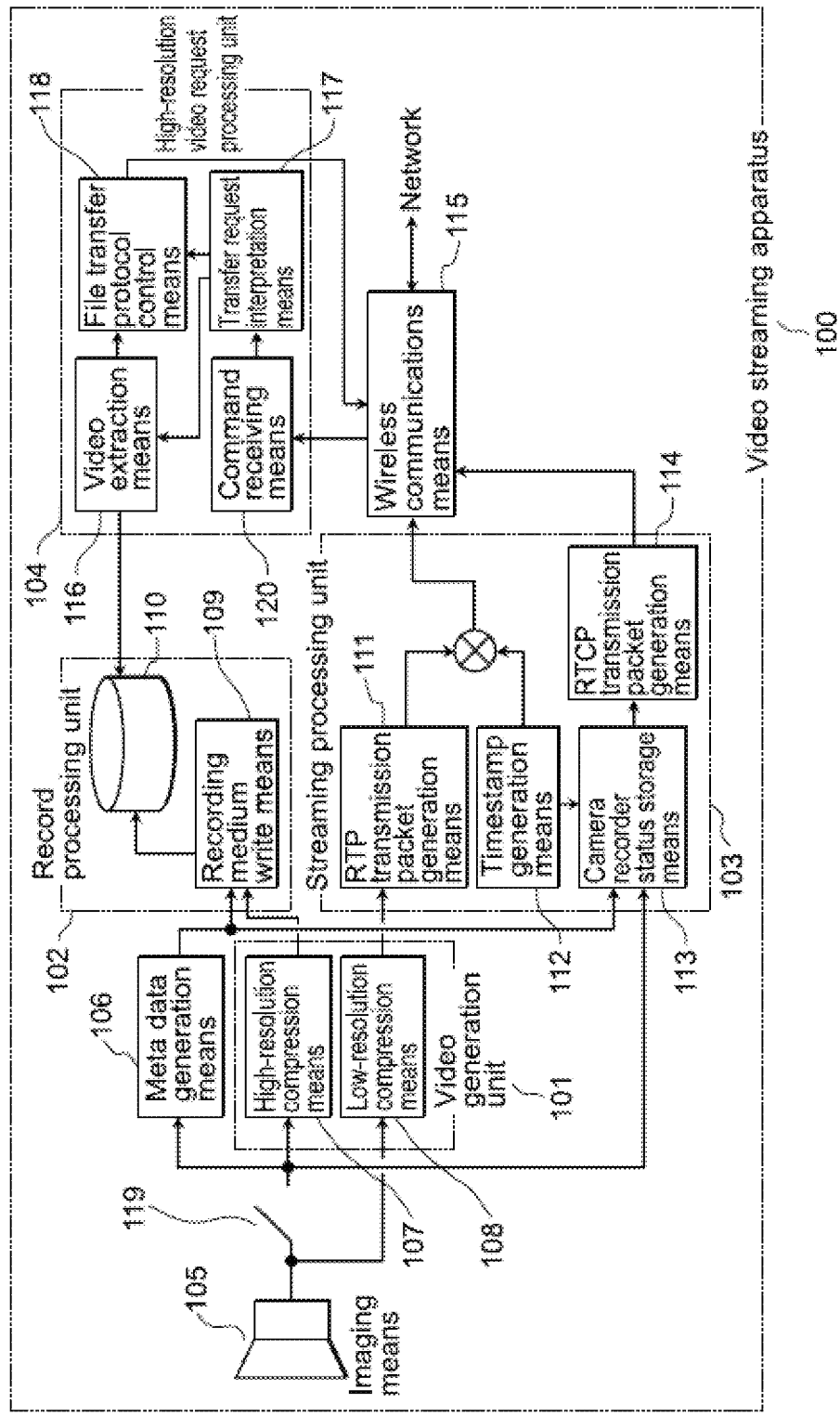
FIG. 1 is a block diagram of a configuration of a video streaming apparatus according to an embodiment of the present disclosure.

Hereinafter, embodiments according to the present disclosure will be described in detail, with reference to the accompanying drawings. Note that unnecessarily detailed description may be omitted. For example, detailed description of well-known matters or description previously set forth with respect to substantially the same configuration may be omitted. This is to avoid unnecessary redundancy in the description below and for facilitating an understanding by a person skilled in the art.

The accompanying drawings and the description below are provided for a thorough understanding of the present disclosure by a person skilled in the art and are not intended to be limiting the subject matter recited in the claims appended hereto.

Embodiment

In recent years, high-speed wireless communications are becoming available in cities, as represented by the prevalence of WiMAX and 4G/LTE. Owing to this, uploading digital data such as a picture and a video captured by a digital camera and a digital video camera to online services such as a cloud server via wireless communication is being realized.

For example, a video delivery system is contemplated in which video data is captured and transmitted to a video editing apparatus through a network. A video streaming apparatus captures and records high-resolution video data into a recording apparatus. However, the recording apparatus may not record all captured videos. The video streaming apparatus further generates and streams low-resolution video data. The video editing apparatus receives the low-resolution video data. A user of the video editing apparatus checks the low-resolution video data and selects a portion for which high-resolution video data is needed, thereby obtaining the high-resolution video data.

However, the high-resolution video data for the video portion that is selected based on the low-resolution video data by the user of the video editing apparatus may not be recorded in the video streaming apparatus.

According to a video streaming apparatus, a video editing apparatus, and a video delivery system of the present disclosure, a user of the video editing apparatus can readily check whether high-resolution video data is recorded in the video streaming apparatus.

1. System Configuration

A video delivery system according to the present embodiment of the present disclosure includes a video streaming apparatus and a video editing apparatus. The video streaming apparatus captures a video and records the video as high-resolution video data. The video streaming apparatus further generates low-resolution video data from the video and streams the low-resolution video data through a network. A user of the video editing apparatus views the low-resolution video data received by the video editing apparatus and designates a range for which the user needs for high-resolution video data. The video editing apparatus transmits the range designated by the user to the video streaming apparatus. The video streaming apparatus extracts high-resolution video data in the designated range and transmits the high-resolution video data to the video editing apparatus.

Referring to FIG. 13, the video delivery system according to the present disclosure which includes video streaming apparatus 100 and video editing apparatus 200 is described. FIG. 13 is a diagram illustrating a flow of video editing using the video delivery system. Video streaming apparatus 100 streams low-resolution video data to video editing apparatus 200. If video streaming apparatus 100 is in a recording state in which video streaming apparatus 100 records high-resolution video, video streaming apparatus 100 records high-resolution video data into recording medium 110. User 218 of video editing apparatus 200 browses through the streamed low-resolution video and designates a time range for which user 218 desires to obtain a high-resolution video. Next, video editing apparatus 200 transmits to video streaming apparatus 100 information indicating the time range designated by user 218. Video streaming apparatus 100 extracts desired video data from the high-resolution video data recorded in recording medium 110, based on the time range. Video streaming apparatus 100 transmits the desired video data extracted from the high-resolution video data to video editing apparatus 200. User 218 creates a high definition video to be broadcasted, using the high-resolution video data obtained from video streaming apparatus 100.

A configuration of video streaming apparatus 100 according to the present embodiment is now described. FIG. 1 is a block diagram of a configuration of video streaming apparatus 100 according to the present embodiment.

Video streaming apparatus 100 includes video generation unit 101, record processing unit 102, streaming processing unit 103, and high-resolution video request processing unit 104. A specific example of video streaming apparatus 100 is a video camera which includes means for connecting to a network, and can stream a video to the network and records the video into a video file on a built-in recording medium simultaneously.

Video streaming apparatus 100 includes imaging means 105. Imaging means 105 comprises hardware for converting optical information into electronic information and software for controlling the hardware. For example, imaging means 105 can be implemented in an image sensor, such as a CCD image sensor or CMOS image sensor, and driver software which controls the image sensor.

A video captured by imaging means 105 is input to high-resolution compression means 107 and meta data generation means 106, according to start/end recording instruction means 119. Start/end recording instruction means 119 is implemented using a start/end recording button of a video camera which is pressed by a user of the video camera. Start/end recording instruction means 119 toggles its state when the start/end recording button is pressed. When start/end recording instruction means 119 is in the recording state, imaging means 105 outputs a captured video to high-resolution compression means 107, etc. When start/end recording instruction means 119 is in a stop state, imaging means 105 stops outputting the captured video to high-resolution compression means 107, etc.

Imaging means 105 outputs the captured video to low-resolution compression means 108 as well. Note that the captured video is input to low-resolution compression means 108 even when start/end recording instruction means 119 is in the stop state. Low-resolution video data that is obtained by compressing the captured video by low-resolution compression means 108 is smaller in amount of data than high-resolution video data that is obtained by compressing the captured video by high-resolution compression means 107. Low-resolution video data is transmitted through a network and remotely viewed. Note that low-resolution video data is viewable in real time at a remote location by imaging means 105, while capturing a video, streaming low-resolution video data of the video. Low-resolution video data is streamed through the network, independent of a status of start/end recording instruction means 119. This allows a viewer of the low-resolution video data to remotely view the video continuously, irrespective of operations of start/end recording instruction means 119.

High-resolution compression means 107 and low-resolution compression means 108 are configured with software or hardware which compresses an input video and outputs the compressed video data. Video stream included in the input video is compressed using, for example, H.264. Audio stream included in the input video is compressed using, for example, advanced audio coding (AAC). High-resolution compression means 107 is configured to output video data having a bit rate higher than a bit rate of video data that is output from low-resolution compression means 108.

The high-resolution video data output from high-resolution compression means 107 is input to record processing unit 102. Record processing unit 102 includes recording medium write means 109 and recording medium 110.

Examples of recording medium 110 include an SD card, hard disk drive, and optical disk.

Recording medium write means 109 writes, as a video file, the high-resolution video data output from high-resolution compression means 107 into recording medium 110. Recording medium write means 109, as used herein, is configured with software or hardware for writing data as a file to recording medium 110. For example, recording medium write means 109 is a file system module for operating systems such as Windows (registered trademark) and Linux (registered trademark).

Meta data generation means 106 is configured with software which generates additional information (meta data) regarding the video file recorded by video streaming apparatus 100. Recording medium write means 109 writes, as a meta data file, meta data output from meta data generation means 106 to recording medium 110. What is written to the additional information is described in detail below.

Low-resolution compression means 108 outputs the low-resolution video data to streaming processing unit 103. Streaming processing unit 103 includes RTP transmission packet generation means 111, timestamp generation means 112, camera recorder status storage means 113, and RTCP transmission packet generation means 114.

Figure 7:
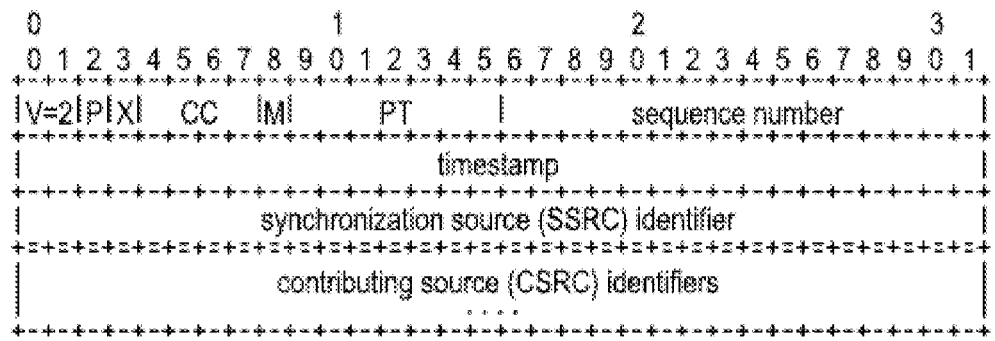
FIG. 7 is a diagram of a configuration of an RTP fixed header according to the embodiment.

The low-resolution video data output from low-resolution compression means 108 is input to RTP transmission packet generation means 111. RTP transmission packet generation means 111 is configured with software which encodes the low-resolution video data into communication packets to be delivered via a real time protocol (RTP). RTP is a video streaming method in the RFC3550 standard. The communication packet (RTP packet) according to RTP contains an RTP fixed header and a payload. The video data is included in the payload. FIG. 7 shows an RTP fixed header (see Section 5.1 of RFC3550). The RTP fixed header contains a field which describes a timestamp. The timestamp is a numeric value representing a time instant of the video data included in the payload of the RTP packet. In general, the value of the timestamp increases monotonically and linearly relative to a time instant at which a video is captured. The timestamp is used to play back the video data included in the payload at a recipient terminal of the streamed video data. The timestamp controls output timing of a video and audio during playback of the video data. This allows the video and audio to be synchronized.

Timestamp generation means 112 generates a timestamp value. For 11.264 video codec, the timestamp monotonically increases at 90 kHz (see section 5.1 of RFC3984).

A timestamp generated by timestamp generation means 112 is added to an RTP packet. Wireless communication means 115 delivers the RTP packet over the network.

Wireless communication means 115, as used herein, is hardware used to transfer electronic data through a wireless network, examples of which include wireless LAN module, 4G/LTE connection adapter, etc.

In general, RTP streaming is controlled based on an RTP control protocol (RTCP). RTCP is standardized according to RFC3550, as with RTP. RTP is used to transmit content body such as video stream and audio stream. RTCP is used by a stream sender terminal and a recipient terminal to exchange statistics such as the number of transmitted bytes, the number of transmitted packets, the number of packets lost, jitter, feedback information, and round-trip time. RTCP transmission packet generation means 114 is configured with software which generates packets for RTCP. An RTCP packet generated by RTCP transmission packet generation means 114 is streamed from wireless communication means 115 to the recipient terminal through the network.

In the present embodiment, information indicating a status of video streaming apparatus 100 is added to the RTCP packet. Camera recorder status storage means 113 obtains the status of video streaming apparatus 100 and stores information indicating the status of video streaming apparatus 100. Camera recorder status storage means 113 further outputs the information to RTCP transmission packet generation means 114. RTCP transmission packet generation means 114 adds to the RTCP packet the information indicating the status of video streaming apparatus 100 as additional information. This sends the information indicating the status of video streaming apparatus 100 to the recipient terminal of the streamed data. The content of the additional information included in the RTCP packet is described in detail below Video streaming apparatus 100 according to the present embodiment receives a command through the network, and transmits the high-resolution video data recorded in recording medium 110 through the network, based on the command.

High-resolution video request processing unit 104 includes command receiving means 120, video extraction means 116, transfer request interpretation means 117, and file transfer protocol control means 118. High-resolution video request processing unit 104 extracts a portion of the high-resolution video data that is recorded as a file in recording medium 110. High-resolution video request processing unit 104 further transmits the extracted portion of the high-resolution video data through the network.

Command receiving means 120 receives a high-resolution video transfer request transmitted from an external terminal through wireless communication means 115. The high-resolution video transfer request contains information indicating an endpoint to which the recorded high-resolution video data is to be transferred. A specific example of the high-resolution video transfer request command is described below. Note that command receiving means 120 is configured with software which receives information from an external terminal through the network. Command receiving means 120 is implemented using a web application programming interface (API) provided by a web server, for example.

Command receiving means 120 receives a command through the network, and notifies transfer request interpretation means 117 of the command. Transfer request interpretation means 117 is configured with software which interprets a packet received from the network. Based on a high-resolution video transfer request indicated by the packet, transfer request interpretation means 117 notifies video extraction means 116 of a file and a range of the file to be extracted. Video extraction means 116 is configured with software capable of extracting a specific time range of a video file and creating a new video file. This allows video extraction means 116 to transmit through the network a high-resolution video of the time range specified in the high-resolution video transfer request. Note that video extraction means 116 may write the extracted video data on recording medium 110 as a video file. Alternatively, video extraction means 116 may store the extracted video data in a volatile built-in memory until the completion of transmission of the extracted video data.

File transfer protocol control means 118 transmits the high-resolution video data extracted by video extraction means 116 to a designated server through the network. If a destination server, to which extracted high-resolution video data is transferred, is specified in the high-resolution video transfer request, file transfer protocol control means 118 transmits the extracted high-resolution video data to the server. If a destination server, to which extracted high-resolution video data is transferred, is not specified in the high-resolution video transfer request, file transfer protocol control means 118 transmits the extracted high-resolution video data to a server which is a default transfer endpoint configured on server video streaming apparatus 100. Here, file transfer protocol control means 118 is configured with software for transferring a file through the network, specific examples of which include a File Transfer Protocol client (FTP client).

Figure 2:
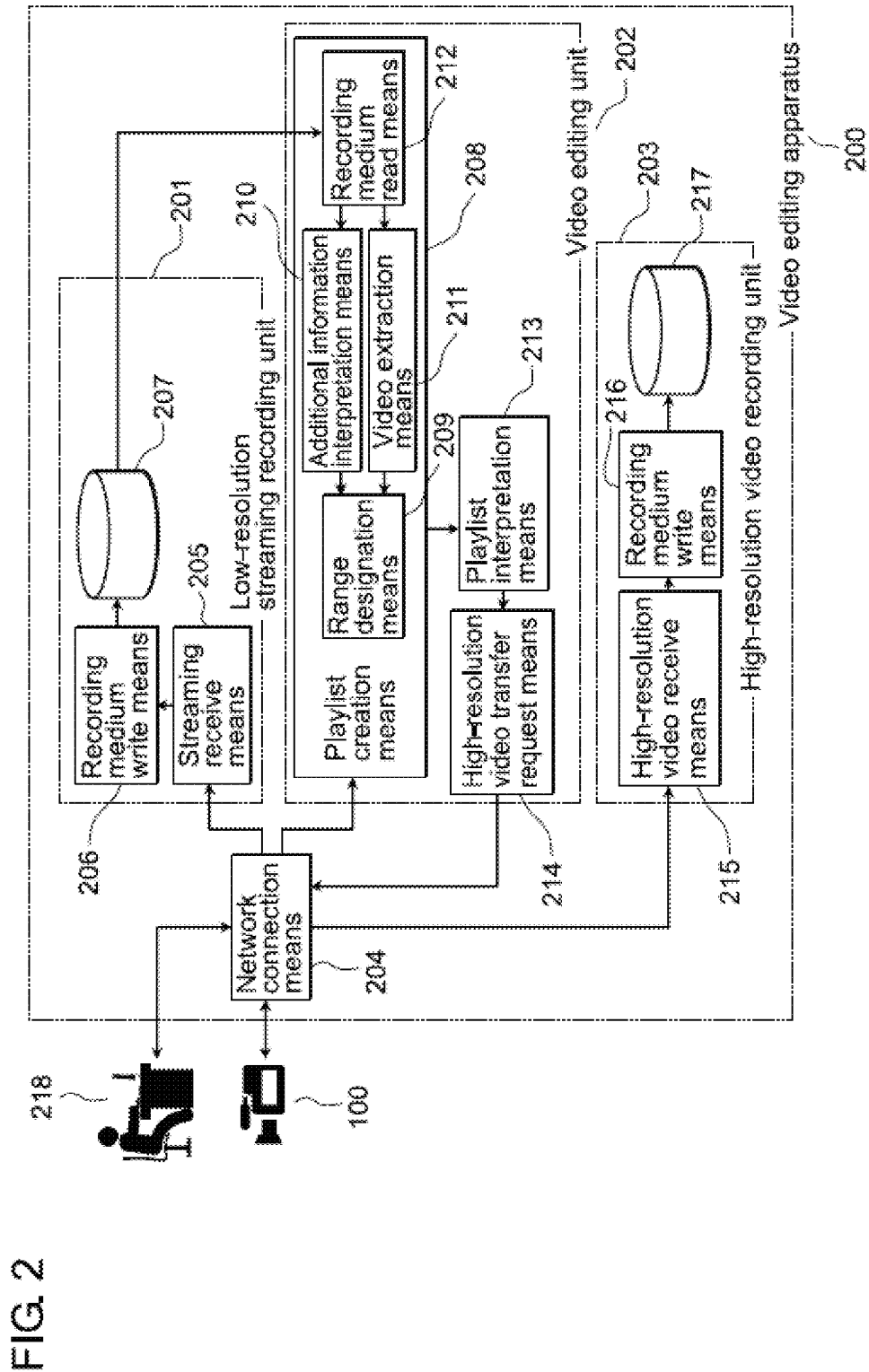
FIG. 2 is a block diagram of a configuration of a video editing apparatus according to the embodiment.

Next, a configuration of the video editing apparatus according to the present embodiment is described. FIG. 2 is a block diagram of a configuration of the video editing apparatus according to the present embodiment.

Video editing apparatus 200 includes low-resolution streaming recording unit 201, video editing unit 202, and high-resolution video recording unit 203 as primary components. Examples of video editing apparatus 200 include a web server using a general-purpose computer, and a personal computer having video editing software installed. The present embodiment is described with reference to video editing apparatus 200 as a web server.

Video editing apparatus 200 includes network connection means 204. Network connection means 204 is configured with hardware and software that are used to transmit and receive electronic data through the Internet. Network connection means 204 is configured of, for example, a wired LAN adapter and its driver software, etc.

Video editing apparatus 200 receives the low-resolution video streamed from video streaming apparatus 100, using network connection means 204. The streamed low-resolution video received by video editing apparatus 200 is input to low-resolution streaming recording unit 201. Low-resolution streaming recording unit 201 includes streaming receive means 205, recording medium write means 206, and recording medium 207.

Streaming receive means 205 establishes a session with video streaming apparatus 100 through network connection means 204. This allows streaming receive means 205 to receive low-resolution video streamed from video streaming apparatus 100. Streaming receive means 205 is configured with streaming receive software capable of receiving communications via RTP and RTCP, for example. Streaming receive means 205 outputs the data streamed from video streaming apparatus 100 to recording medium write means 206. Recording medium write means 206 records the streamed data as a file to recording medium 207. Recording medium write means 206 is configured with software or hardware for writing data as a file to recording medium 207. In the case where recording medium 207 is a non-volatile recording medium such as a hard disk drive, recording medium write means 206 corresponds to a file system module for operating systems such as Windows (registered trademark) and Linux (registered trademark). In the case where recording medium 207 is a volatile memory such as a DRAM, recording medium write means 206 corresponds to a memory allocation control module for the operating systems. Note that the streamed data, as used herein, encompasses not only the low-resolution video data, but also the additional information. To be more specific, the streamed data contains video and audio data that are received in RTP packets, and the additional information that are received in RTCP packets.

User 218 of video editing apparatus 200 according to the present embodiment can access video editing unit 202 included in video editing apparatus 200, through the network. User 218 edits a video recorded in recording medium 207, using video editing unit 202. Video editing unit 202 includes playlist creation means 208, playlist interpretation means 213, and high-resolution video transfer request means 214.

In the present embodiment, playlist creation means 208 is a web application implemented over the web server. User 218 accesses playlist creation means 208 using a web browser installed in a PC owned by user 218, for example. User 218 can browse through the streamed data recorded in recording medium 207 through playlist creation means 208.

Playlist creation means 208 includes recording medium read means 212, range designation means 209, additional information interpretation means 210, and video extraction means 211.

Recording medium read means 212 is configured with software or hardware which reads a video data to be edited by user 218 from recording medium 207. Recording medium read means 212 outputs the video data to additional information interpretation means 210 and video extraction means 211.

The data streamed from video streaming apparatus 100 includes a status of video streaming apparatus 100 added thereto as the additional information, as mentioned above. Additional information interpretation means 210 is configured with software which extracts from the streamed data and interprets the additional information. Video extraction means 211 is configured with software which extracts portions related to video and audio from the streamed data.

Additional information interpretation means 210 and video extraction means 211 output the processing results to range designation means 209. Range designation means 209 is configured with software which provides user 218 with video and audio data to be edited. User 218 designates a range for which user 218 desires for high-resolution video data, using range designation means 209. Range designation means 209 is a web application for providing graphical user interface (GUI) which allows user 218 to designate a portion for which user 218 needs high-resolution video data, while playing the video and audio, for example. A specific example of the GUI is described below.

While range designation means 209 is described with reference to a GUI provided by a web application in the present embodiment, it should be noted that range designation means 209 is not limited to an interface that is visually recognizable by user 218. Range designation means 209 may have capabilities of specifying to playlist creation means 208 a time range designated by user 218, based on video and audio data to be edited and its additional information. For example, range designation means 209 may be provided as, what is called, a web API.

Range designation means 209 outputs information on the range designated by user 218 to playlist interpretation means 213. Playlist interpretation means 213 is configured with software which generates a high-resolution video transfer request, based on the information on the range designated by user 218. Playlist interpretation means 213 outputs the high-resolution video transfer request to high-resolution video transfer request means 214. High-resolution video transfer request means 214 transmits the high-resolution video transfer request to video streaming apparatus 100 through the network. Note that high-resolution video transfer request means 214 is configured with software which transmits information to command receiving means 120 included in video streaming apparatus 100. In the case where command receiving means 120 is a web API, high-resolution video transfer request means 214 is configured as a web client which issues the information on the range designated by user 218 as a POST command.

As described above, when video streaming apparatus 100 receives a high-resolution video transfer request, video streaming apparatus 100 extracts a designated range from the high-resolution video data recorded in recording medium 110, and transmits the designated range to video editing apparatus 200 through the network. High-resolution video recording unit 203 included in video editing apparatus 200 according to the present embodiment is configured with software and hardware for recording the high-resolution video data transmitted from video streaming apparatus 100. High-resolution video recording unit 203 includes high-resolution video receive means 215, recording medium write means 216, and recording medium 217.

High-resolution video receive means 215 is configured with software for receiving data transmitted from video streaming apparatus 100. For example, when file transfer protocol control means 118 included in video streaming apparatus 100 is an FTP client, high-resolution video receive means 215 is an FTP server.

High-resolution video receive means 215 receives and records high-resolution video data into recording medium 217 through recording medium write means 216. Recording medium write means 216, as used herein, is configured with software or hardware for writing video data as a file to recording medium 217. Recording medium 217 is, for example, a hard disk drive or the like.

Note that low-resolution streaming recording unit 201, video editing unit 202, and high-resolution video recording unit 203 which are included in video editing apparatus 200 may not necessarily be implemented on the same computer. The functions of the components may be implemented on different computers and achieve, as a whole, the functionality of video editing apparatus 200 by these computers cooperating with each other via the network.

2. Operation

In the following, operations of video streaming apparatus 100 and video editing apparatus 200 are described with reference to an example of data having specific content.

Video streaming apparatus 100 and video editing apparatus 200 are connected over the Internet (network).

A low-resolution video, captured by video streaming apparatus 100, is transferred to video editing apparatus 200 using RTP and RTSP protocols. The RTP packet contains a timestamp and a payload. The payload in the RTP packet contains video and audio captured at a time instant indicated by the timestamp in the RTP packet.

RTCP transmission packet generation means 114 adds the status of video streaming apparatus 100 known by camera recorder status storage means 113 to the RTCP packet as additional information. The RTCP packet having the additional information added thereto is transferred from video streaming apparatus 100 to video editing apparatus 200. Note that the additional information added to the RTCP packet includes a timestamp which corresponds to the timestamp in the RTP packet.

In the following, a specific example of the method of adding a status of the camera recorder to the RTCP packet is described.

According to RFC3550, the following five RTCP packets are defined: "Receiver Report (RR)," "Sender Report (SR),"

"Source Description (SDES)," "BYE," and "Application-Defined (APP)" (see Section 6 of RFC3550). RR and SR are used to confirm quality of communication between a sender and a recipient. SDES is used to convey an identification of a participant in streaming, for example. BYE is a packet for giving notice of the end of the streaming.

APP is an RTCP packet that is prepared to allow proprietary extensions of application. In the present embodiment, this type of packet is utilized to add the status of video streaming apparatus 100 to data to be streamed.

Figure 6:
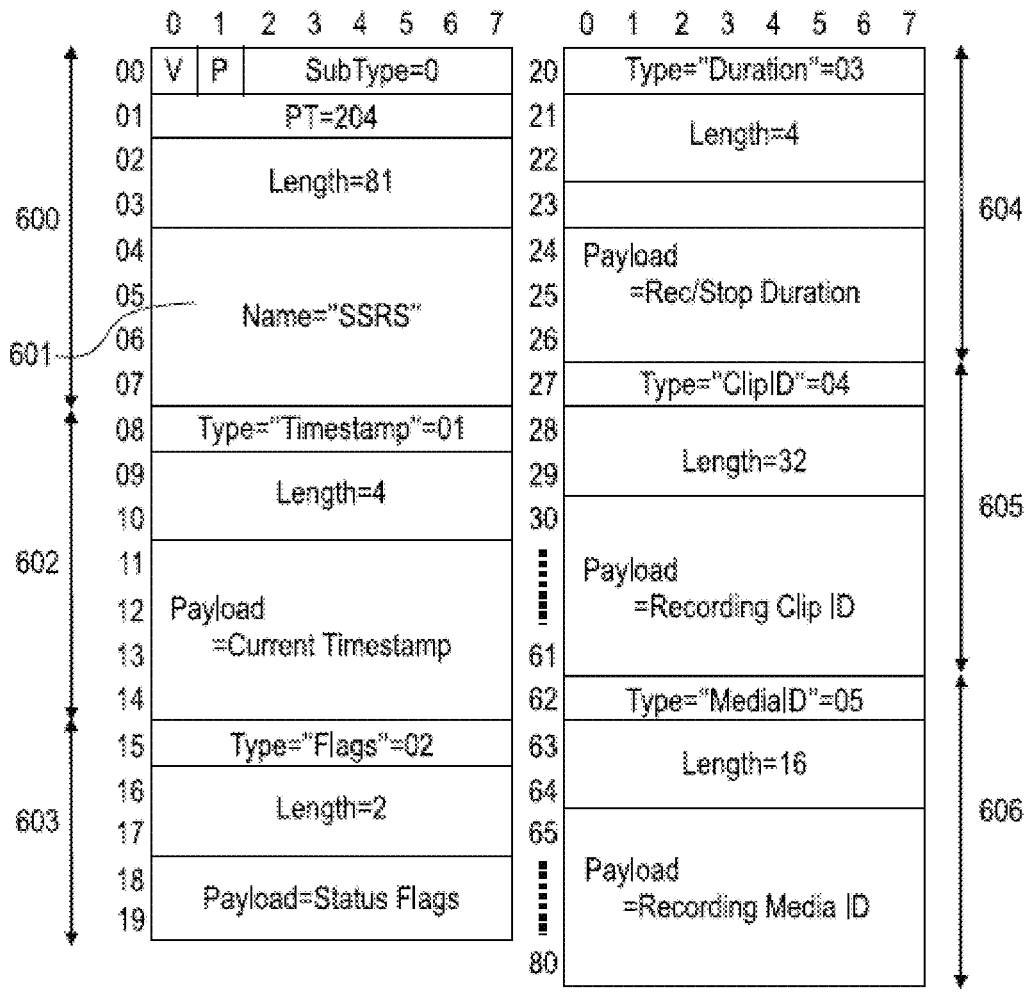
FIG. 6 is a diagram of a configuration of an application-defined RTCP packet according to the embodiment.

A basic configuration of the Application-Defined RTCP packet according to the present embodiment is illustrated in FIG. 6. FIG. 6 illustrates information stored in each bit of an RTCP packet, beginning from the start of the packet.

0th byte to 7th byte (area 600) are a portion standardized as a structure of the Application-Defined RTCP packet (see Section 6.7 of RFC3550). The name area (area 601) is a space for storing an application name. A string "SSRS" (standing for scalable streaming recorder system) is used as the application name in the present embodiment.

8th byte and the subsequent bytes (area 602 to area 606) have data structures unique to the present embodiment. Data stored in these bytes consists of the repetition of three pieces of information "type", "length", and "payload." The "payload" area corresponds to a payload for storing, for example, video data. The "type" is 1-byte area, representing a type of data stored in the payload. Correspondence between values of "type" and content of the payload is illustrated in FIG. 8.

"Length" is a 2-byte area and indicates the number of bytes of the payload portion.

8th byte to 14th byte (area 602) describe a timestamp with which the additional information is associated. As mentioned above, the timestamp is a numeric value representing a time instant of video data included in a payload of the RTP packet. This allows association of a specific time instant of video and audio data delivered by the RTP packet and the additional information described in RTCP packet corresponding to the time instant.

In the present embodiment, for each of frames of a low resolution streaming video being streamed via RTP, RTCP transmission packet generation means 114 generates an Application-Defined RTCP packet having additional information added thereto. As mentioned above, the Application-Defined RTCP packet is associated with a specific time instant of a video included in the RTP packet, by a timestamp described in 8th byte to 14th byte (area 602). To be more specific, the additional information included in the RTCP packet is associated with a video frame corresponding to the time instant of the video included in the RTP packet. In other words, in the present embodiment, additional information is associated with every frame of a streamed low-resolution video. Owing to this, every frame of video data streamed to video editing apparatus 200 contains a low-resolution video.

15th byte to 19th byte (area 603) describe a status of video streaming apparatus 100 at the time instant indicated by the timestamp included in the RTCP packet (hereinafter, referred to as "device status information"). The device status information contains information indicating whether high-resolution video data is held in recording medium 110. Specifically, the device status information contains information indicating whether video streaming apparatus 100 is recording high-resolution video data generated by high-resolution compression means 107 into recording medium 110 (in recording state) or not (in non-recording state). In the present embodiment, if the least significant bit of a sequence of bits stored in a payload (Status Flags) for the device status information is 0, this indicates that video streaming apparatus 100 is in the non-recording state, and if the least significant bit is 1, this indicates that video streaming apparatus 100 is in the recording state. In the recording state, high-resolution video data including one at the time instant is expected to be recorded as a video file in recording medium 110. To be more specific, if the least significant bit of the sequence of bits stored in the payload for the device status information in the RTCP packet is 1, high-resolution video data at the time instant indicated by the timestamp included in the RTCP packet is expected to be held in recording medium 110.

20th byte to 26th byte (area 604) describe duration of the high-resolution video data recording state at the time instant indicated by the timestamp of the video included in the RTP packet with which the RTCP packet is associated (hereinafter, referred to as "state duration information"). To be more specific, if the least significant bit of the sequence of bits stored in the payload of the RTCP packet for the device status information is 1, the number of frames that has been recorded since the start of recording of the most recent high-resolution video is stored in the payload in area 604. On the other hand, if the least significant bit of the sequence of bits stored in the payload of the RTCP packet for the device status information included is 0, a total number of frames corresponding to the elapsed time since the recording of the immediately preceding high-resolution video has entered the stop state is stored the payload in area 604. While the unit of value which is stored in the payload in area 604 is the number of frames in the present embodiment, it should be noted that any unit may be used insofar as the value can show the number of frames which have elapsed since the operational status has changed. The unit of value stored in the payload in area 604 may be a millisecond, for example.

27th byte to 61st byte (area 605) store an ID for uniquely identifying a video file in which high-resolution video data corresponding to the frame at the time instant indicated by the timestamp included in the RTCP packet is stored (hereinafter, referred to as "clip ID information"). Area 605 is provided if the least significant bit of the payload for the device status information included in the RTCP packet is 1. A specific example of the method of generating the ID for uniquely identifying the high-resolution video file is unique material identifier (UMID: SMPTE 330M) which is used as a standard material identifier in the broadcasting industry. BASIC UMID used as the ID has a 32-byte length. Use of UMID as the ID allows the video file to be uniquely identified. Note that the video file may not necessarily be identified using only the value that is stored in area 605. For example, the value stored in area 605 may be a value that can identify the video file in combination with an ID for identifying the media. For example, the value that is stored in area 605 may be a file name of the video file.

62nd byte to 80th byte (area 606) store an ID for uniquely identifying recording medium 110 in which the video file corresponding to the RTCP packet is recorded (hereinafter, referred to as "media ID information"). Area 606 is provided if the least significant bit of the payload for the device status information included in the RTCP packet is 1. If an SD memory card is used as recording medium 110, a value of the CID register (Card Identification Register) of the SD memory card may be used as the media ID information. The CID register of the SD memory card holds 16-byte value which includes information such as the manufacturer and the serial number.

The ID for uniquely identifying the video file and the ID for uniquely identifying recording medium 110 are obtained from meta data generation means 106.

Figure 11:
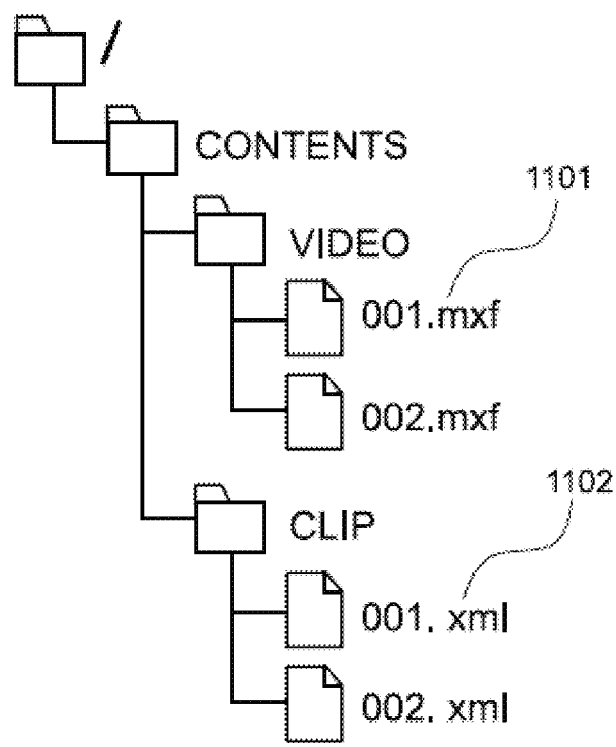
FIG. 11 is a diagram showing an example of a directory structure in a recording medium according to the embodiment.

Meta data generation means 106 records the clip ID information and the media ID information into recording medium 110. To be more specific, if video streaming apparatus 100 records high-resolution video data as a video file, two files, a video file and a meta data file generated by meta data generation means 106 are stored into recording medium 110. These files generated from one recording are stored in recording medium 110 in association with each other. FIG. 11 illustrates an example of a directory structure of the video file in recording medium 110. A CONTENTS folder exists in the file system of recording medium 110. Files which are recorded by video streaming apparatus 100 into recording medium 110 are all stored under the CONTENTS folder. A VIDEO folder and CLIP folder exist under the CONTENTS folder. The video file storing the high-resolution video data is stored in the VIDEO folder. The meta data file is stored in the CLIP folder. The same name is given to a video file and a meta data file that are corresponding to each other, except for the extension. In the example illustrated in FIG. 11, a high-resolution video file named "001.mxf" placed under the VIDEO folder corresponds to a meta data file named "001.xml" placed under the CLIP folder. The association using the file name allows a person and a computer to readily tell the association between the video file and meta data file.

Video files 1101 are recorded in a file format named Material eXchange Format (MXF: SMPTE377M). This is a file format widely used in professional video equipment. In contrast, meta data files 1102 are stored in a file format named eXtensible Markup Language (XML). The XML format is a markup language whose description is highly flexible and thus is suited for professional video equipment that requires various additional information.

A specific example of the content of the meta data file is illustrated in FIG. 12. The additional information are all described under the "P2Main" tag. Further, technical parameters such as the video format and the audio format are described under the "ClipContent" tag. The additional information such as creation date, equipment used for capturing the video, and memo are described under the "ClipMetadata" tag.

The additional information illustrated in FIG. 12 contains "GlobalClipID." "GlobalClipID" is ID information for uniquely identifying the video file that is associated with the meta data file. The ID is an alphanumeric string having a sufficient length, and is generated by a certain algorithm, such that different video files are always allocated with different ID information. An example of the GlobalClipID generation algorithm is a UMID generation algorithm.

In the present embodiment, ID information such as UMID is generated and stored in the meta data file. If the file name need be changed, the association between the video file and the meta data file can be maintained by changing the file name of the video file and the file name of the meta data file simultaneously. This allows the association between the clip ID information and video data to be maintained.

Now, a problem associated with using only the file name of the video file as the ID (clip ID information) for identifying the video file is described. While the present embodiment is described with reference to recording medium 110 being one recording medium, the present disclosure is not limited thereto. For example, to collect two video files having the same file name recorded in different recording media 110 to one recording medium 110, either one of the video files needs to be renamed. Accordingly, the clip ID information associated with a video data and the file name of the video file corresponding to the video name may not match. Similar problem is likely to occur also when a video file is moved to a cloud server and managed. This is more problematic, particularly, in the MS-DOS file system used for the SD memory card, for example. In the MS-DOS file system, an alphanumeric value of 8 or more characters cannot be used as a file name. For this reason, it is difficult to give a unique name to every video file captured in the world.

"MediaID" also describes information for uniquely identifying recording medium 110.

Recoding these meta data, including the clip ID information, in recording medium 110 in association with a video file allows a video file that is requested for by a high-resolution video transfer request and a designated range to be readily identified.

Operation of video editing apparatus 200 having received streamed data containing the RTCP packet set forth above is described.

The streamed data received by video editing apparatus 200 is stored into recording medium 207. The streamed data contains additional information, besides video and audio data. Information on the status of video streaming apparatus 100 (the device status information) that is included in the RTCP packet mentioned above is also included in the additional information.

Figure 3:
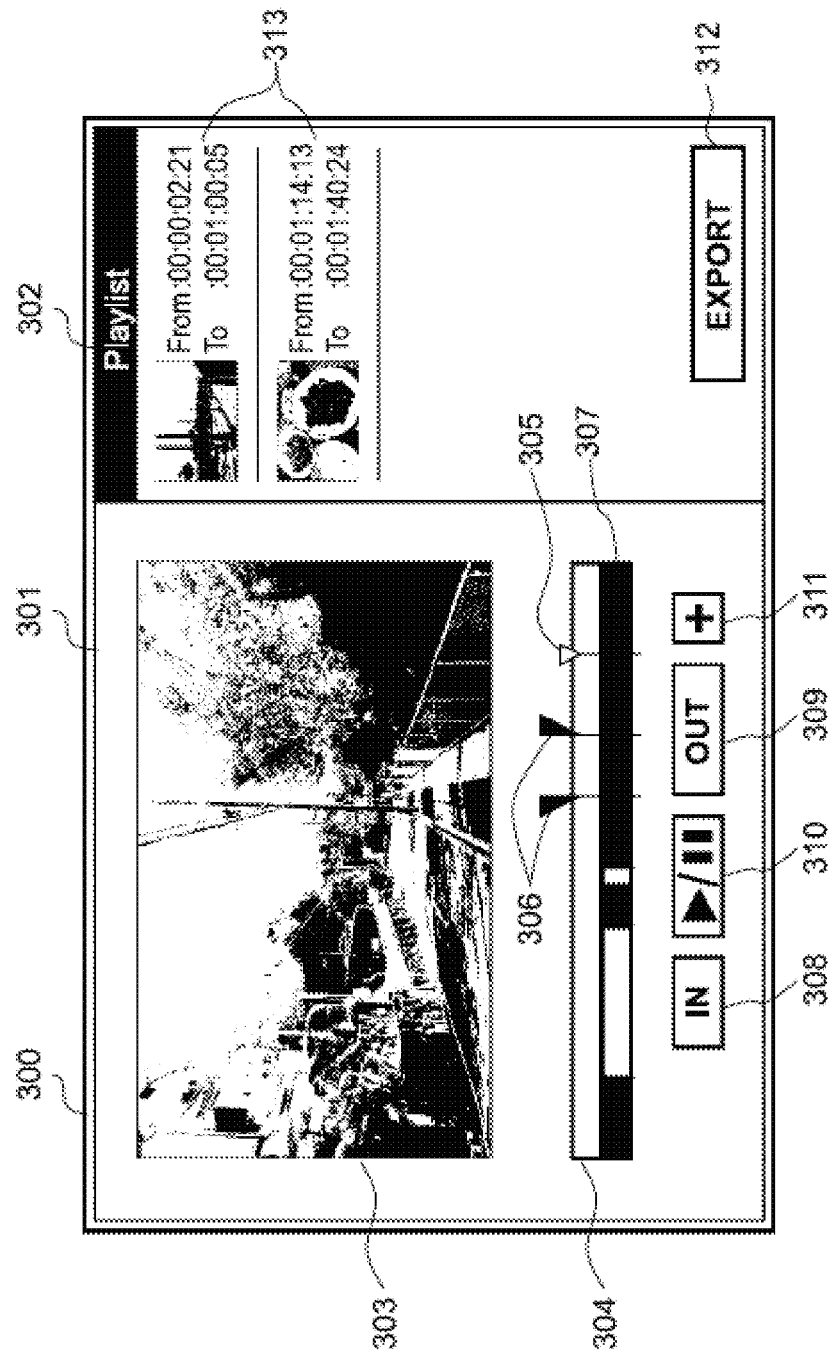
FIG. 3 is a diagram illustrating an example of a GUI screen of the video editing apparatus according to the embodiment.

Video editing apparatus 200 includes video editing unit 202. Video editing unit 202 provides range designation means 209 to user 218 of video editing apparatus 200. User 218 of video editing apparatus 200 designates a time range for a high-resolution video transfer request, using range designation means 209. In the present embodiment, range designation means 209 is a GUI for a video editing screen provided in a web application. User 218 can designate a range for which user 218 desires for high-resolution video data, using the video editing screen. An example of the video editing screen which achieves range designation means 209 is illustrated in FIG. 3.

In the present embodiment, the video editing screen is a web application. The video editing screen is displayed on a screen of a web browser installed in the PC owned by user 218.

Video editing screen 300 includes player unit 301 and playlist unit 302. Player unit 301 is a screen for user 218 to browse through streamed low-resolution video data and select a time range for which user 218 desires for high-resolution video data. Playlist unit 302 is a screen on which the time range designated by user 218 is displayed as entries in a list. Note that video data to be edited on video editing screen 300 is also denoted as editing video data.

The video is played back or paused on streaming playback screen 303 by user 218 operating play/pause button 310. User 218 browses through the video displayed on streaming playback screen 303, and clicks IN-point designating button 308 when the beginning of a range for which user 218 desires for high-resolution video data (hereinafter, referred to as an "IN point") is displayed. User 218 clicks OUT-point designating button 309 when the end of the range for which user 218 desires for high-resolution video data (hereinafter, referred to as an "OUT point") is displayed. Accordingly, user 218 can designate the range from the IN point to the OUT point as the time range for the high-resolution video transfer request.

A temporal position of the video being browsed through by user 218 is indicated by playback position pointer 305 on seek bar 304. The left end of seek bar 304 indicates a temporal position at which the video streaming is started. The right end of seek bar 304 indicates the most recent temporal position at which the video is streamed to video editing apparatus 200. If the video streaming from video streaming apparatus 100 is ongoing, the temporal position indicated by the right end of seek bar 304 is updated from moment to moment.

The temporal positions of the IN point and OUT point designated by user 218 are indicated on seek bar 304 by an IN point pointer and an OUT point pointer (306), respectively. Having determined the IN point and OUT point, when user 218 clicks add playlist entry button 311, the time range defined by the IN point and OUT point is added as entry 313 to the playlist.

Video streaming apparatus 100 streams low-resolution video data irrespective of whether video streaming apparatus 100 is recording high-resolution video data corresponding to the low-resolution video. For this reason, the low-resolution video data that can be browsed through on player unit 301 contains both a time range of low-resolution video data whose corresponding high-resolution video data is recorded in recording medium 110 included in video streaming apparatus 100 and a time range of low-resolution video data whose corresponding high-resolution video data is not recorded in recording medium 110. Among time ranges that are designated by user 218 on video editing screen 300, user 218 can actually obtain only high-resolution video data that is included in time ranges of low-resolution video data whose corresponding high-resolution video data are recorded.

Effective-range display bar 307 indicates "time ranges in which high-resolution video data corresponding to low-resolution video data are recorded." This allows user 218 to visually recognize the time ranges of low-resolution video data whose corresponding high-resolution video data are recoded. Effective-range display bar 307 indicates to user 218 the time ranges of low-resolution video data whose corresponding high-resolution video data are recorded in video streaming apparatus 100 in a certain color among the entire time range defined by the left end and the right end of seek bar 304. In FIG. 3, the portions of effective-range display bar 307 that are filled with black correspond to the time ranges of low-resolution video data whose corresponding high-resolution video data are recorded. Moreover, the white portions of effective-range display bar 307 correspond to the time ranges of low-resolution video data whose corresponding high-resolution video data are not recorded.

Additional information interpretation means 210 identifies the time ranges of low-resolution video data whose corresponding high-resolution video data are recorded. Effective-range display bar 307 indicates the identified time ranges of low-resolution video data whose corresponding high-resolution video data are recorded. The operation of additional information interpretation means 210 is described below.

An RTCP packet transmitted by video streaming apparatus 100 contains, as additional information, a timestamp and information indicating a status of video streaming apparatus 100 at a time instant indicated by the timestamp. Video streaming apparatus 100 transmits one RTCP packet, containing the additional information, per frame of low-resolution video data. Additional information interpretation means 210 identifies a time range of low-resolution video data whose corresponding high-resolution video data is recorded, based on the timestamp included in area 602 of the RTCP packet containing the additional information and a value of the least significant bit for the device status information.

Note that if high-resolution video data corresponding to low-resolution video data is recorded in video streaming apparatus 100, additional information interpretation means 210 can also identify a video file in which the high-resolution video data, including the frame, is recorded, from information described in the clip ID information and media ID information that are included in the RTCP packet.

However, the RTCP packet may be lost over the network. Accordingly, video editing apparatus 200 may not be able to receive all RTCP packets.

The communications via the RTCP protocol are real-time sensitive and thus, generally, are performed via a user diagram protocol (UDP). In communications via UDP, when some packets are dropped before reaching a recipient, the dropped packets are not resend to the recipient. In other words, in the present embodiment, RTCP packets storing the additional information may be delivered to video editing apparatus 200 with some RTCP packets being dropped.

In the video delivery system according to the present embodiment, video editing apparatus 200 determines, for each of frames of streamed low-resolution video, "whether high-resolution video data corresponding to the frame is recorded in recording medium 110 included in video streaming apparatus 100." To this end, the time range of low-resolution video data whose corresponding high-resolution video data is recorded needs to be identified even when some RTCP packets are not delivered to video editing apparatus 200.

Alternatively, video editing apparatus 200 may be configured to identify, in the streamed low-resolution video, the beginning of the time range of low-resolution video data whose corresponding high-resolution video data is recorded. This simplifies the process of video editing apparatus 200 obtaining the high-resolution video data from video streaming apparatus 100. Specifically, this allows video editing apparatus 200 to synchronize the elapsed times since the most recent recording start time of high-resolution video data to the IN point and to the OUT point of a time range designated by user 218 of video editing apparatus 200, with elapsed times in the video file. As such, if the beginning of the time range of low-resolution video data whose corresponding high-resolution video data is recorded can be identified, a corresponding time range in a video file to be extracted can be readily identified from values corresponding to the IN point and OUT point.

Figure 5:
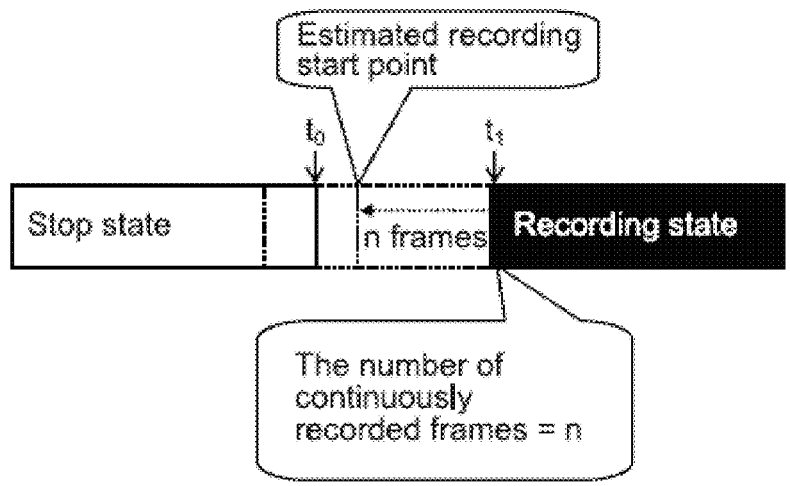
FIG. 5 is a diagram illustrating an outline of an estimated recording start point in the case of packet drop according to the embodiment.

Additional information interpretation means 210 is configured to be able to accurately identify the beginning of the time range of low-resolution video data whose corresponding high-resolution video data is recorded even if some RTCP packets are dropped. FIG. 5 illustrates a method of identifying the beginning of the time range of low-resolution video data whose corresponding high-resolution video data is recorded, using the number of continuously recorded frames, with reference to the case where RTCP packets from timestamp t0 to timestamp t1 are dropped.

Additional information interpretation means 210 is able to determine, from the device status information stored in an RTCP packet whose timestamp is prior to t0, that high-resolution video data at the timestamp is not recorded as a video file in video streaming apparatus 100. Additional information interpretation means 210 is also able to determine, from the device status information stored in an RTCP packet whose timestamp is after t1, that high-resolution video data at the timestamp is recorded as a video file in video streaming apparatus 100. However, the RTCP packets from t0 to t1 are lost and an RTCP packet corresponding to a time instant at which video streaming apparatus 100 has changed from the stop state to the recording state is not received by video editing apparatus 200. For this reason, the beginning of the time range of low-resolution video data whose corresponding high-resolution video data is recorded cannot be identified from only the device status information in the RTCP packets received by video editing apparatus 200.

According to the present embodiment, the beginning of the time range of low-resolution video data whose corresponding high-resolution video data is recorded can be identified even in such a case as illustrated in FIG. 5, by using the state duration information stored in the RTCP packet. Here, assume that "n frames" are stored in the state duration information recorded in the RTCP packet whose timestamp is t1, as illustrated in FIG. 5. To be more specific, assume that the frame corresponding to time instant t1 corresponds to the nth frame since video streaming apparatus 100 changed to the recording state. In this case, the beginning of the time range of low-resolution video data whose corresponding high-resolution video data is recorded corresponds to a time instant back in time from t1 by n frames. In this manner, if some RTCP packets are dropped, additional information interpretation means 210 compensates for the dropped RTCP packets, using the number of continuously recorded frames stored in an RTCP packet generated after the dropped RTCP packets. Such additional information interpretation means 210 is useful in identifying the beginning of the time range of low-resolution video data whose corresponding high-resolution video data is recorded.

As such, additional information interpretation means 210 identifies and displays, in a color-coded manner, a time range of low-resolution video data whose corresponding high-resolution video data is recorded on effective-range display bar 307. This allows user 218 to readily check the time range of low-resolution video data whose corresponding high-resolution video data is recorded.

While the time range of low-resolution video data whose corresponding high-resolution video data is recorded is indicated to user 218 by displaying it in a color-coded manner on effective-range display bar 307 in the present embodiment, it should be noted that any means may be used that can allow user 218 to know the time range of low-resolution video data whose corresponding high-resolution video data is recorded. For example, user 218 may be provided with a web API through which text information describing the time range of low-resolution video data whose corresponding high-resolution video data is recorded can be downloaded.

Use of range designation means 209 according to the present embodiment allows user 218 to select a desired time range from among time ranges of low-resolution video data whose corresponding high-resolution video data are obtainable.

Noted that the following two approaches are effective ways of allowing user 218 to select only a time range in low-resolution video data for which high-resolution video data is obtainable through operation of range designation means 209.

Figure 10:
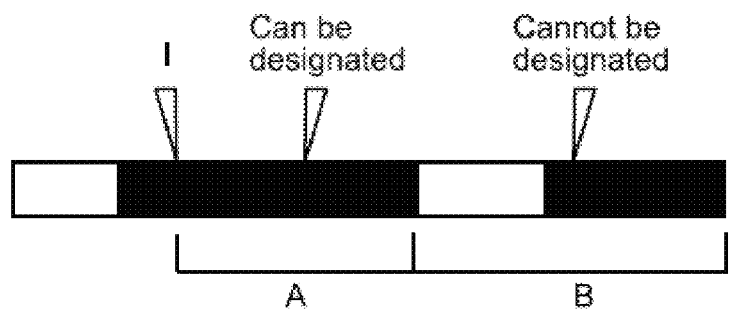
FIG. 10 is a diagram showing an example of the way of limiting a range which can be designated, according to the embodiment.

The first approach is to limit time ranges selectable by user 218 using range designation means 209. Specifically, if there is a time range of low-resolution video data whose corresponding high-resolution video data is not obtainable between the IN point and OUT point designated by user 218, the designation is disabled, thereby limiting the selectable time ranges. For example, if user 218 determines the temporal position indicated by I in FIG. 10 as the IN point, range designation means 209 is set so that user 218 can designate an OUT point in the interval indicated by A but cannot designate it in the interval indicated by B. Specifically, if the IN point is in interval A, the operation of designating an OUT point may be disabled in intervals other than interval A.

Figure 4:
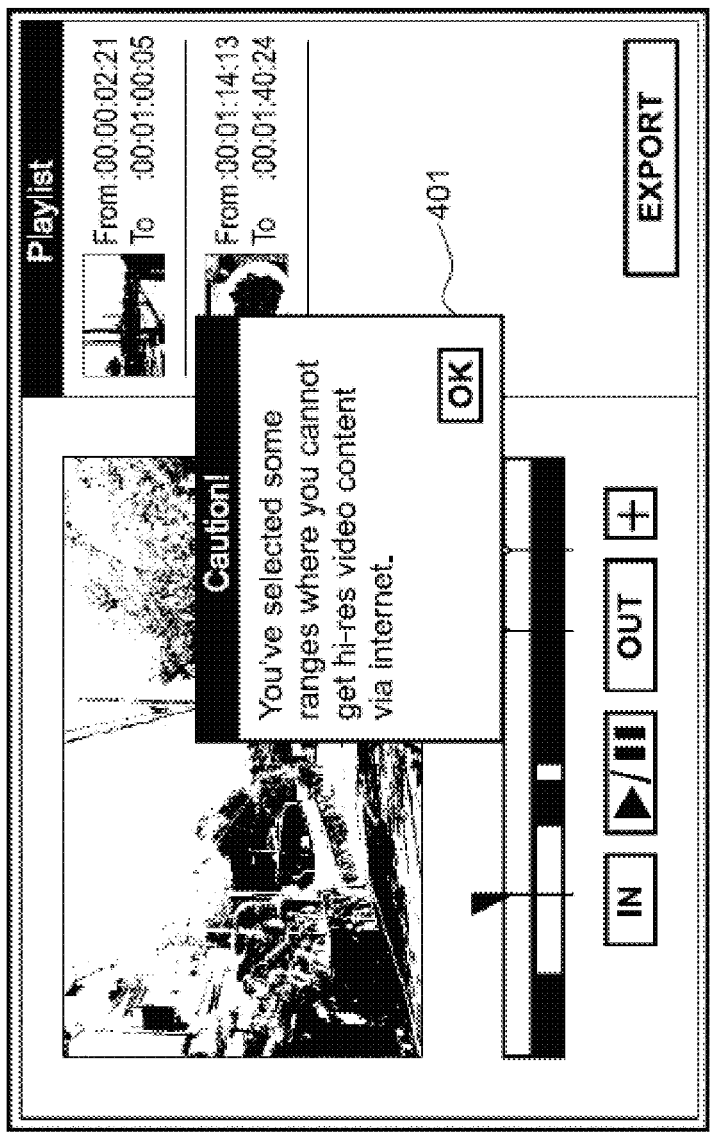
FIG. 4 is a diagram illustrating an example of a warning indicator displayed on the GUI screen of the video editing apparatus according to the embodiment.

The second approach is to give notice to user 218 when user 218 attempts to designate a time range which covers a time range of low-resolution video data whose corresponding high-resolution video data is not obtainable. In other words, a warning is displayed to user 218 when user 218 determines an IN point and OUT point, if the time range defined by IN point and OUT point includes a time range of low-resolution video data whose corresponding high-resolution video data is not recorded. Specifically, there is a method of displaying, on a GUI used by user 218, warning dialog 401 explaining that the time range designated by user 218 includes a time range of low-resolution video data whose corresponding high-resolution video data is not recorded, as illustrated in FIG. 4. Note that after displaying warning dialog 401, time ranges in the designated time range, except for the time range of low-resolution video data whose corresponding high-resolution video data is not obtainable, may be automatically added as entries to the playlist. Moreover, warning dialog 401 may be displayed until user 218 changes the time range so that a time range designated no longer includes the time range of low-resolution video data whose corresponding high-resolution video data is not obtainable. Note that warning dialog 401 is not limited to a dialog box. For example, simply, a warning text may be displayed.

In such a way, user 218 can designate a range for which user 218 desires for high-resolution video data, using playlist creation means 208. After repeating the range specification operation and having entered all needed ranges to the playlist, user 218 clicks export button 312. Once export button 312 is clicked, the playlist created by user 218 is notified to playlist interpretation means 213 and converted into a high-resolution video transfer request requesting for high-resolution video data. FIG. 9 illustrates an example of the transfer request in the present embodiment.

The high-resolution video transfer request is described using extensible markup language (XML). Each of the entries of the playlist created by user 218 through playlist creation means 208 is represented using an <Event> tag. Two entries are included in the example illustrated in FIG. 9.

<Duration> represents a length (the unit is the number of frames) of a range designated in an entry.

<Source> represents a video file from which the entry is to be extracted. For example, the first <Event> tag in FIG. 9 indicates that video data according to the entry is recorded in recording medium 110 whose MediaID is "AA009D09660011223344556677889900." Further, this entry specifies the 540th frame as the begging frame of high-resolution video data to be extracted in a video file whose ClipID is "060A2B340101010501010D431300000001381367103405 FF00000000 00000000." Since video editing apparatus 200 receives such information as additional information (605 and 606) included in an RTCP packet, the high-resolution video transfer request can be specified using MediaID and ClipID.

The high-resolution video transfer request thus created is transmitted to video streaming apparatus 100 via the network. The high-resolution video transfer request is interpreted by transfer request interpretation means 117 included in video streaming apparatus 100. Under the interpretation, video extraction means 116 extracts the designated time range from the designated video file, based on the high-resolution video transfer request. The extracted high-resolution video data is transferred by file transfer protocol control means 118 to video editing apparatus 200.

According to video streaming apparatus 100 and video editing apparatus 200 of the embodiment described above, user 218 of video editing apparatus 200 is allowed to obtain, through the network, high-resolution video data of video data captured by video streaming apparatus 100. User 218 is allowed to browse through streamed low-resolution video data, designate a time range for which user 28 desires for high-resolution video data, and cause video streaming apparatus 100 to transfer the time range. Further, user 218 can confirm a time range whose high-resolution video data is not obtainable through the time range designation, prior to transmission of a high-resolution video transfer request. This allows user 218 to efficiently obtain high-resolution video data even in situations where network communication speed is not sufficient.

Referring to FIG. 13, the video delivery system according to the present disclosure which includes video streaming apparatus 100 and video editing apparatus 200 is described. FIG. 13 is a diagram illustrating a flow of video editing using the video delivery system. Video streaming apparatus 100 streams low-resolution video data to video editing apparatus 200. If video streaming apparatus 100 is in a recording state in which video streaming apparatus 100 records high-resolution video, video streaming apparatus 100 records high-resolution video data into recording medium 110. User 218 of video editing apparatus 200 browses through the streamed low-resolution video and designates a time range for which user 218 desires to obtain a high-resolution video. Next, video editing apparatus 200 transmits to video streaming apparatus 100 information indicating the time range designated by user 218. Video streaming apparatus 100 extracts desired video data from the high-resolution video data recorded in recording medium 110, based on the time range. Video streaming apparatus 100 transmits the desired video data extracted from the high-resolution video data to video editing apparatus 200. User 218 creates a high definition video to be broadcasted, using the high-resolution video data obtained from video streaming apparatus 100.

As such, the embodiment has been described by way of example of the technology disclosed herein. The technology according to the present disclosure is, however, not limited thereto and is applicable to any embodiments to which modifications, permutations, additions, and omissions are made. Alternatively, the components set forth with reference to the above embodiment described above may be combined into a new embodiment.

The video streaming apparatus and the video editing apparatus according to the present disclosure allows a user of the video editing apparatus to efficiently obtain high-resolution video data through the network. For example, a staff in a broadcasting station is able to obtain a most recent video having high image quality, without waiting for a camera operator collecting information at a remote location to return. In industries utilizing video, acceleration of operation of system and cost saving can be expected.

What is claimed is:

1. A video transmitting apparatus which records and transmits video data, the video transmitting apparatus comprising:
   a non-transitory computer readable medium configured to record video data;
   a communication interface configured to:
      generate a transmission data unit by dividing video data; and
      transmit the generated transmission data unit;
   a processor configured to:
      generate first video data from an optical image and cause the non-transitory computer readable medium to record the generated first video data; and
      generate second video data from the optical image having a bit rate lower than the first video data and cause the communication interface to transmit the second video data; and
      receive a time range information in the second video data selected by a user; and
      transfer the first video data which corresponds to the time range information.

2. The video transmitting apparatus according to claim 1, wherein
   the communication interface transmits information indicating duration of recording of the first video data by the non-transitory computer readable medium.

3. The video transmitting apparatus according to claim 1, wherein
   the communication interface transmits a total number of frames of the first video data which have been recorded since the non-transitory computer readable medium started recording the first video data.

4. The video transmitting apparatus according to claim 1, wherein
   the communication interface transmits identification for uniquely identifying the video file corresponding to the first video data.

5. The video transmitting apparatus according to claim 1, wherein
   the communication interface transmits information which indicates whether the first video data is recorded in the video file.

* * * * *